(12) United States Patent
Kempe

(10) Patent No.: US 8,837,490 B2
(45) Date of Patent: *Sep. 16, 2014

(54) SYSTEMS AND METHODS FOR DYNAMICALLY ADJUSTING QOS PARAMETERS

(71) Applicant: AT&T Intellectual Property I, LP, Atlanta, GA (US)

(72) Inventor: Eddie Albert Kempe, Reston, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/773,672

(22) Filed: Feb. 22, 2013

(65) Prior Publication Data

US 2013/0163421 A1 Jun. 27, 2013

Related U.S. Application Data

(63) Continuation of application No. 12/719,132, filed on Mar. 8, 2010, now Pat. No. 8,391,292, which is a continuation of application No. 10/889,349, filed on Jul. 12, 2004, now Pat. No. 7,675,916.

(51) Int. Cl.
*H04L 12/56* (2006.01)

(52) U.S. Cl.
USPC ................... 370/395.21; 370/232

(58) Field of Classification Search
None
See application file for complete search history.

(56) References Cited

U.S. PATENT DOCUMENTS

| | | |
|---|---|---|
| 4,763,319 A | 8/1988 | Rozenblit |
| 5,649,110 A | 7/1997 | Ben-Nun et al. |
| 5,793,748 A | 8/1998 | Murase |
| 6,021,263 A | 2/2000 | Kujoory et al. |
| 6,154,778 A | 11/2000 | Koistinen et al. |
| 6,407,983 B1 | 6/2002 | Zheng et al. |
| 6,680,949 B1 | 1/2004 | Briem |
| 6,707,820 B1 | 3/2004 | Arndt et al. |
| 7,076,552 B2 | 7/2006 | Mandato |
| 7,093,044 B2 * | 8/2006 | Joy et al. ........................ 710/110 |
| 7,675,916 B2 | 3/2010 | Kempe |
| 2004/0008689 A1 * | 1/2004 | Westphal et al. ......... 370/395.21 |

OTHER PUBLICATIONS

Schmitt et al., Apr. 1997 Technical Report TR-KOM-1997-01, Darmstadt University of Technology.

* cited by examiner

*Primary Examiner* — David Oveissi
(74) *Attorney, Agent, or Firm* — Parks IP Law LLC

(57) ABSTRACT

A method for dynamically adjusting QoS parameters associated with a virtual circuit is disclosed. The virtual circuit includes a first end connected to a first router and a second end connected to a second router. The method includes receiving an offer message at the second router, and sending a request message to the first router. The offer message includes a first set of QoS parameters and the request message includes a second set of QoS parameters. The method further includes receiving a request confirmation message at the second router, receiving a new offer message at the second router, and sending information compliant with the second set of QoS parameters to the first router. The new offer message includes the second set of QoS parameters.

18 Claims, 5 Drawing Sheets

SYSTEMS AND METHODS FOR DYNAMICALLY ADJUSTING QOS PARAMETERS

BACKGROUND

This application is related, generally and in various embodiments, to systems and methods for dynamically adjusting QoS parameters.

It is known in the art that over-subscription of circuits can lead to congestion, and a corresponding increase in dropped packet, delay and jitter. For some technologies such as VoIP, an increase in dropped packets, delay and jitter can result in an unacceptable level of service. To avoid over-subscribing a circuit, it is known to shape traffic on a virtual circuit to insure that packets are only put on the virtual circuit at a rate that is acceptable by the receiving end of the virtual circuit. Packets that are sensitive to loss, delay and jitter are prioritized and sent first and other packets may be dropped or delayed to ensure that the circuit is not oversubscribed. However, for some applications, the delay or dropping of packets is unacceptable.

The parameters currently used to shape traffic on a virtual circuit are statically configured. When a virtual circuit is not be utilized, its resources are still reserved to avoid over-subscribing the circuit should the virtual circuit become utilized. The reservation serves to prevent other virtual circuits from taking advantage of the relatively low utilization of the circuit. Thus, in such circumstances, the circuit as a whole becomes underutilized.

SUMMARY

In one general respect, this application disclosed embodiments of methods for dynamically adjusting QoS parameters associated with a virtual circuit. The virtual circuit includes a first end connected to a first router and a second end connected to a second router. According to various embodiments, the method includes receiving an offer message at the second router, and sending a request message to the first router. The offer message includes a first set of QoS parameters and the request message includes a second set of QoS parameters. The method further includes receiving a request confirmation message at the second router, receiving a new offer message at the second router, and sending information compliant with the second set of QoS parameters to the first router. The new offer message includes the second set of QoS parameters.

According to various embodiments, the method includes sending an offer message to the second router, receiving an offer rejection message at the first router, and sending a new offer message to the second router. The offer message includes a first set of QoS parameters and the new offer message includes a second set of QoS parameters. The method further includes receiving information compliant with the second set of QoS parameters at the first router.

In another general respect, this application discloses embodiments of systems. According to various embodiments, the system includes a first router and a second router. The second router is in communication with the first router via a virtual circuit defined by the first and second routers. The first router is configured for dynamically adjusting at least one QoS parameter associated with the virtual circuit before sending information to the second router.

Other embodiments of the disclosed invention will be or become apparent to one skilled in the art upon review of the following drawings and detailed description. It is intended that all such additional embodiments be included within this description, be within the scope of the disclosed invention, and be protected by the accompanying claims.

DETAILED DESCRIPTION

It is to be understood that the figures and descriptions of the disclosed invention have been simplified to illustrate elements that are relevant for a clear understanding of the disclosed invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

Figure 1:
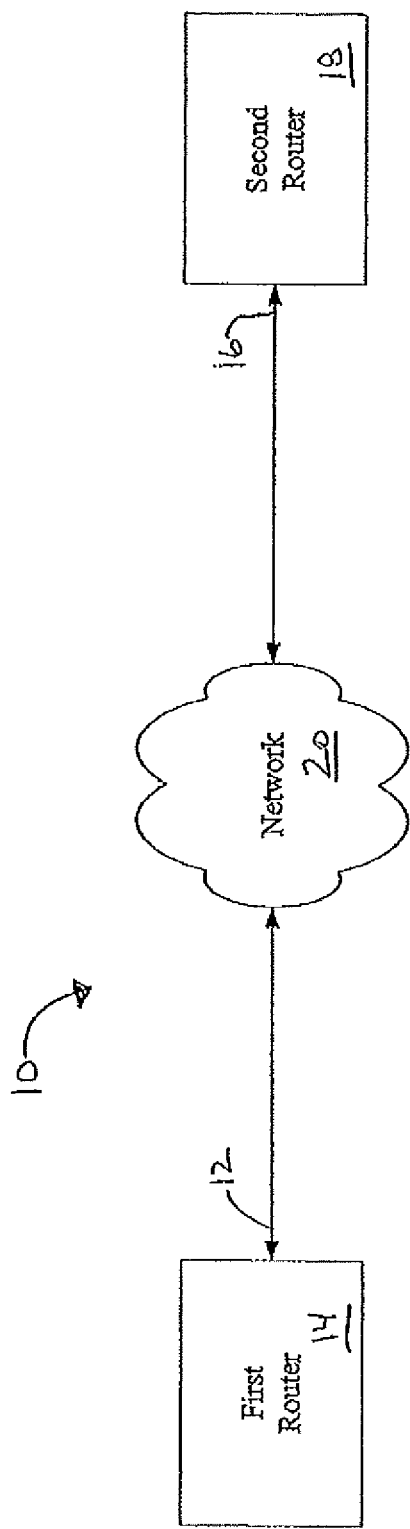
FIG. 1 illustrates various embodiments of a virtual circuit.
Figure 2A:
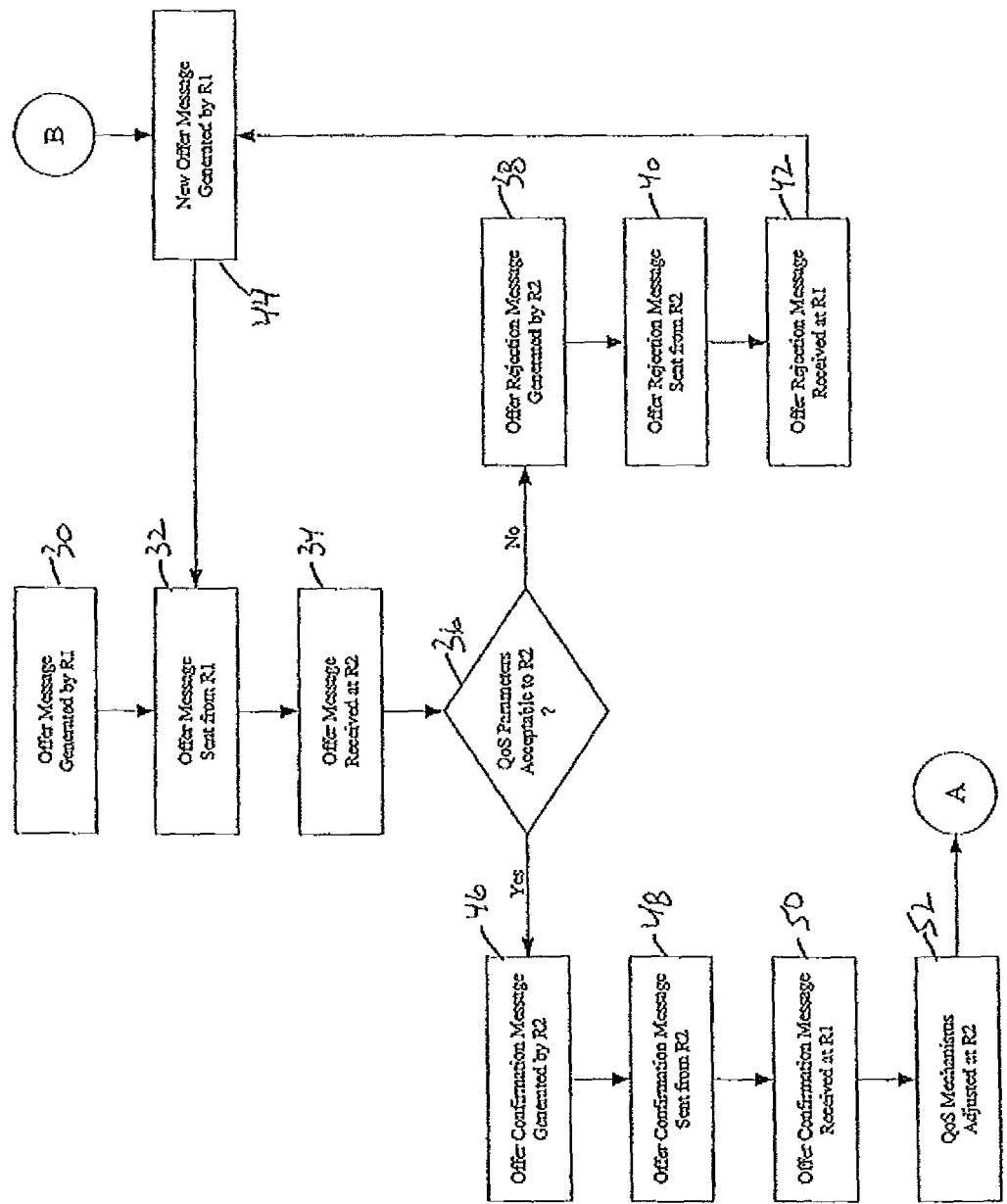
FIGS. 2A-2D illustrate various embodiments of methods for dynamically adjusting QoS parameters associated with the virtual circuit of FIG. 1.
Figure 2B:
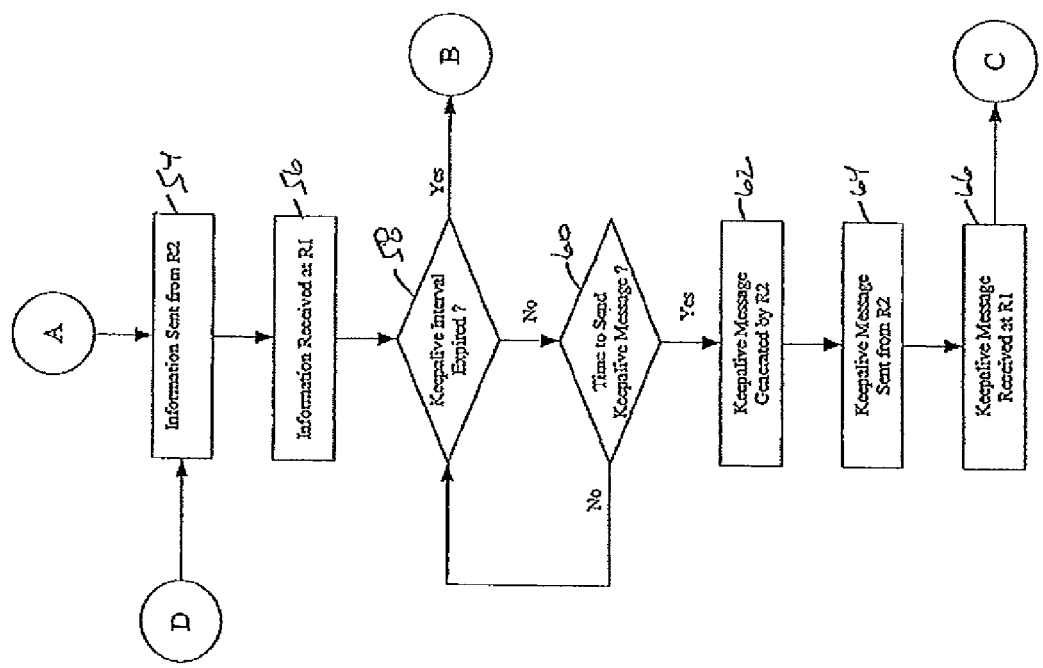
Figure 2C:
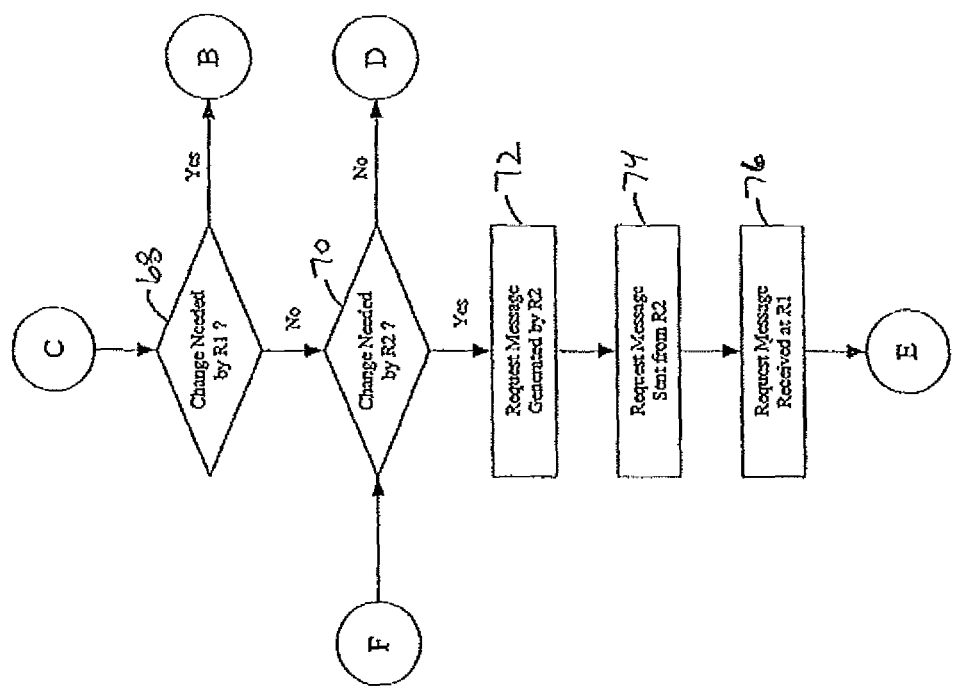
Figure 2D:
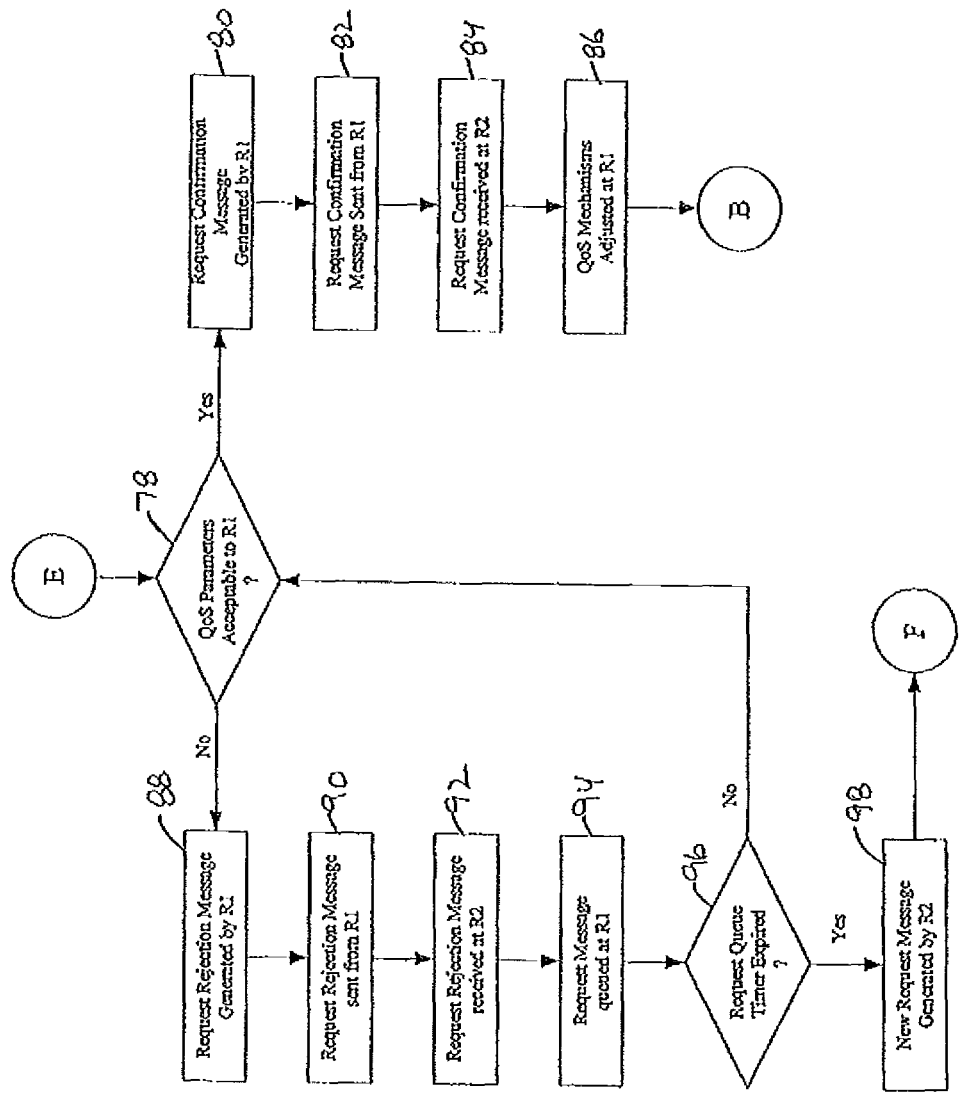

FIG. 1 illustrates various embodiments of a virtual circuit 10. The virtual circuit 10 includes a first end 12 connected to a first router 14 and a second end 16 connected to a second router 18. The first end 12 of the virtual circuit 10 is connected to the second end 16 of the virtual circuit 10 via a network 20. According to various embodiments, the network 20 comprises a portion of a telecommunications network, a local area network, a metropolitan area network, a wide area network, etc. The virtual circuit 10 serves to carry information (e.g., voice and/or data) between the first router 14 and the second router 18.

As shown in FIG. 1, the first router 14 is in communication with the second router 18 via the virtual circuit 10. The first router 14 is configured for dynamically adjusting at least one QoS parameter associated with the virtual circuit 10 before sending information to the second router 18 and the second router 18 is configured for dynamically adjusting at least one QoS parameter associated with the virtual circuit 10 before sending information to the first router 14. According to various embodiments, the first and second routers 14, 18 may be configured for communication with an adjacent lower layer.

FIGS. 2A-2D illustrate various embodiments of methods for dynamically adjusting QoS parameters associated with the virtual circuit 10 of FIG. 1. The acronyms R1 and R2 used in FIGS. 2A-2D refer to the first router 14 and the second router 18, respectively. The process begins at block 30 where an offer message is generated by the first router 14. The offer message includes a first set of QoS parameters that define how the first router 14 desires the second router 18 to send information to the first router 14. The offer message includes, for example, an offer ID, a keepalive interval, QoS parameters (e.g., maximum transmit unit size) for the virtual circuit 10, and the transmission overhead incurred by the first router 14. According to various embodiments, the offer message may include a label and a value for each QoS parameter.

From block 30, the process advances to block 32, where the first router 14 sends the offer message to the second router 18. From block 32, the process advances to block 34, where the second router 18 receives the offer message sent by the first router 14. From block 34, the process advances to block 36, where the second router 18 determines whether it is able to transmit information to the first router 14 compliant with the first set of QoS parameters included in the offer message.

When the first set of QoS parameters is not acceptable to the second router 18, the process advances from block 36 to block 38, where the second router 18 generates an offer rejection message. The offer rejection message includes, for example, the offer ID that was included with the offer message received by the second router 18 at block 34. The offer rejection message may also include a cause code that indicates which QoS parameters in the first set of QoS parameters are unacceptable to the second router 18. From block 38, the process advances to block 40, where the second router 18 sends the offer rejection message to the first router 14. From block 40, the process advances to block 42, where the first router 14 receives the offer rejection message sent by the second router 18. From block 42, the process advances to block 44, where in response to the receipt of the offer rejection message, the first router 14 generates a new offer message. The new offer message generated at block 44 may be similar to the offer message generated at block 30, but may include a new offer ID and a new set of QoS parameters. From block 44, the process returns to block 32, where the process described for block 32-36 is repeated.

When the first set of QoS parameters is acceptable to the second router 18, the process advances from block 36 to block 46, where the second router 18 generates an offer confirmation message. The offer confirmation message may include the offer ID that was included with the offer message received by the second router 18 at block 34. From block 46, the process advances to block 48, where the second router 18 sends the offer confirmation message to the first router 14. From block 48, the process advances to block 50, where the first router 14 receives the offer confirmation message sent by the second router 18. The offer confirmation message serves to indicate that the second router 18 will send information to the first router 14 according to the first set of QoS parameters. From block 50, the process advances to block 52, where the second router 18 adjusts the QoS mechanisms it controls as needed so that the second router 18 will be able to send information compliant with the first set of QoS parameters to the first router 14.

From bock 52, the process advances to block 54, where the second router 18 sends information compliant with the first set of QoS parameters to the first router 14. For example, if the maximum transmit unit size is indicated in the QoS parameters, the second router 18 will not send any packets greater than the maximum transmit unit size. The second router 18 will use the transmission overhead incurred by the first router 14 to determine the number of bits or packets received by the first router 14, which differ from the number of bits or packets sent by the second router 18. From block 54, the process advances to block 56, where first router 14 receives the information sent from the second router 18. From block 56, the process advances to block 58, where the second router 18 determines whether the keepalive interval included with the offer message received by the second router 18 at block 34 has expired.

When the second router 18 determines that the keepalive interval has expired, the process returns to block 44, where the process described in blocks 44 and 32-36 is repeated. When the second router 18 determines that the keepalive interval has not expired, the process advances from block 58 to block 60, where the second router 18 determines whether it is time to send the keepalive message.

When the second router 18 determines that it is not time to send the keepalive message, the process returns to block 58, where the process described for block 58 is repeated. However, when the second router 18 determines that it is time to send the keepalive message, the process advances to block 62, where the second router 18 generates the keepalive message. The keepalive message includes the offer ID that was included with the offer message received by the second router 18 at block 34. From block 62, the process advances to block 64, where the second router 18 sends the keepalive message to the first router 14. According to various embodiments, the second router 18 will generate and send a keepalive message for each keepalive interval. From block 64, the process advances to block 66, where the first router 14 receives the keepalive message sent by the second router 18.

As information continues to be sent from the second router 18 to the first router 14, the process advances from block 66 to block 68, where the first router 14 determines whether it desires to continue to receive information from the second router 18 according to the first set of QoS parameters. When the first router 14 determines that it does not desire to continue to receive information from the second router 18 according to the first set of QoS parameters, the process returns to block 44, where the process described for blocks 44 and 32-36 is repeated. However, when the first router 14 determines that it desires to continue to receive information from the second router 18 compliant with the first set of QoS parameters, the process advances to block 70, where the second router 18 determines whether it desires to continue to send information to the first router 14 compliant with the first set of QoS parameters.

When the second router 18 determines that it desires to continue to send information to the first router compliant with the first set of QoS parameters, the process returns to block 54, where the process described for blocks 54-58 is repeated. However, when the second router 18 determines that it does not desire to continue to send information to the first router 14 in accordance with the first set of QoS parameters, the process advances from block 70 to block 72, where the second router 18 generates a request message. The request message may include a second set of QoS parameters that define how the second router 18 desires to send information to the first router 14. The second set of QoS parameters may be different than the first set of QoS parameters. The request message may include a request ID, a request message queue timer, requested QoS parameters, minimum QoS parameters (e.g., minimum transmission rate), and a sensitive traffic indication. As used herein, a sensitive traffic indication may be, for example, a value that represents whether delay, jitter, bandwidth, or loss sensitive traffic is being sent from the second router 18 to the first router 14. From block 72, the process advances to block 74, where the second router 18 sends the request message to the first router 14. From block 74, the process advances to block 76, where the first router 14 receives the request message sent by the second router 18. From block 76, the process advances to block 78, where the first router 14 determines whether it desires to receive information sent from the second router 18 compliant with the second set of QoS parameters.

When the second set of QoS parameters is acceptable to the first router 14, the process advances from block 78 to block 80, where the first router 14 generates a request confirmation message. The request confirmation message includes the request ID that was included with the request message received by the first router 14 at block 76. From block 80, the process advances to block 82, where the first router 14 sends the request confirmation message to the second router 18. From block 82, the process advances to block 84, where the second router 18 receives the request confirmation message sent by the first router 14. The request confirmation message serves to indicate that the first router 14 will receive information sent from the second router 18 according to the second set of QoS parameters. From block 84, the process advances to block 86, where the first router 14 adjusts the QoS mechanisms it controls as needed so that the first router 14 will be able to receive information sent from the second router 18 compliant with the second set of QoS parameters. From block 86, the process returns to block 44, where a new offer message that may include the second set of QoS parameters is generated by the first router 14. From block 44, the process returns to block 32, where the process described for block 32-36 is repeated.

When the second set of QoS parameters is not acceptable to the first router 14, the process advances from block 78 to block 88, where the first router 14 generates a request rejection message. The request rejection message may include the request ID and the request queue timer that was included with the request message received by the first router 14 at block 76. According to various embodiments, the request queue timer included in the request rejection message is different than the request queue timer included with the request message received by the first router 14 at block 76. From block 88, the process advances to block 90, where the first router 14 sends the request rejection message to the second router 18. From block 90, the process advances to block 92, where the second router 18 receives the request rejection message sent by the first router 14. From block 92, the process advances to block 94, where the request message is queued at the first router 14. The length of time that the request message is queued at the first router 14 is defined by the request queue timer included with the request rejection message generated by the first router 14 at block 88.

From block 94, the process advances to block 96, where the first router 14 determines whether the request queue timer has expired. When the first router 14 determines that the request queue has not expired, the process returns to block 78, where the process described at block 78 is repeated. However, when the first router 14 determines that the request queue timer has expired, the process advances to block 98, where the second router 18 generates a new request message that includes a new request ID. According to various embodiments, the new request message includes the second set of QoS parameters. According to other embodiments, the new request message includes a different set of QoS parameters. From block 98, the process returns to block 74, where the process described for block 74-78 is repeated.

In order to perform the above-described processes, the first router 14 and the second router 18 may each execute a series of instructions. The instructions may be software code to be executed by the first and second routers 14, 18, respectively. The software code may be stored at a series of instructions or commands on a computer readable medium such as random access memory (RAM) and/or a read only memory (ROM), a magnetic medium such as a hard-drive or a floppy disk, or an optical medium such as a CD-ROM. The software code may be written in any suitable programming language using any suitable programming technique. For example, the software code may be written in C using procedural programming techniques, or in Java or C++ using object-oriented programming techniques.

While several embodiments of the disclosed invention have been described, it should be apparent, however, that various modifications, alterations and adaptations to those embodiments may occur to persons skilled in the art with the attainment of some or all of the advantages of the disclosed invention. For example, according to various embodiments, the process described at block 52 may occur before block 48, before block 50, concurrently with block 48, or concurrently with block 50. In addition, although the method of dynamically adjusting QoS parameters is described in terms of adjusting QoS parameters for information sent from the second router 18 to the first router 14, it is understood that the method can also be described in terms of adjusting QoS parameters for information sent from the first router 14 to the second router 18. Furthermore, it is also understood that the first and second routers 14, 28 can communicate with the adjacent lower layer, and that information flow between the first and second routers 14, 18 can be suspended or limited until the QoS parameters are agreed upon. It is therefore intended to cover all such modifications, alterations and adaptations without departing from the scope and spirit of the disclosed invention as defined by the appended claims.

What is claimed is:

1. A device, comprising:
a computing device; and
a memory storing computer-readable instructions, which, when executed by the computing device, cause the computing device to perform operations comprising:
receiving a first offer message including a first set of quality of service parameters and a keep alive interval;
determining whether the computing device is configured to transmit information compliant with the first set of quality of service parameters;
upon determining that the computing device is configured to transmit information compliant with the first set of quality of service parameters:
adjusting a quality of service mechanism for controlling a quality of service parameter; and
sending information compliant with the first set of quality of service parameters;
upon determining that the computing device is not configured to transmit information compliant with the first set of quality of service parameters:
sending a rejection message;
receiving a second offer message including a second set of quality of service parameters and the keep alive interval in response to the rejection message;
determining whether the computing device is configured to transmit information compliant with the second set of quality of service parameters; and
upon determining that the computing device is configured to transmit information compliant with the second set of quality of service parameters:
adjusting a quality of service mechanism for controlling a quality of service parameter; and
sending information compliant with the second set of quality of service parameters;
determining whether the keep alive interval has expired;
upon determining that the keep alive interval has expired, receiving a new offer message and determining whether the computing device is configured to transmit information compliant with a set of quality of service parameters included in the new offer message;
upon determining that the keep alive interval has not expired, determining whether it is time to send a keep alive message; and
upon determining that it is time to send a keep alive message, generating and sending the keep alive message.

2. The device of claim 1, wherein the rejection message includes a cause code indicating which specific quality of service parameters of the first set of quality of service parameters are unacceptable.

3. The device of claim 1, wherein the instructions, when executed by the computing device, further cause the computing device to determine whether the computing device is configured to transmit information compliant with a maximum transmit unit size.

4. The device of claim 1, wherein the instructions, when executed by the computing device, further cause the computing device to determine whether the computing device is configured to transmit information compliant with a minimum transmission rate.

5. The device of claim 1, wherein the instructions, when executed by the computing device, further cause the computing device to adjust more than one quality of service mechanism.

6. The device of claim 1, wherein the instructions, when executed by the computing device, further cause the computing device to perform, upon determining that the computing device is not configured to transmit information compliant with the second set of quality of service parameters, iteratively repeating sending a rejection message, receiving a new set of quality of service parameters in response to the rejection message, and determining whether the computing device is configured to transmit information compliant with the new set of quality of service parameters until a determination is made that the computing device is configured to transmit information compliant with the new set of quality of service parameters.

7. The device of claim 1, wherein the instructions, when executed by the computing device, further cause the computing device to send an offer confirmation message upon determining that the computing device is configured to transmit information compliant with quality of service parameters included in an offer message.

8. A method, comprising:
  receiving, at a computing device, a first offer message including a first set of quality of service parameters and a keep alive interval;
  determining whether the computing device is configured to transmit information compliant with the first set of quality of service parameters;
  upon determining that the computing device is configured to transmit information compliant with the first set of quality of service parameters:
    adjusting a quality of service mechanism for controlling a quality of service parameter; and
    sending information compliant with the first set of quality of service parameters;
  upon determining that the computing device is not configured to transmit information compliant with the first set of quality of service parameters:
    sending a rejection message;
    receiving a second offer message including a second set of quality of service parameters and the keep alive interval in response to the rejection message;
    determining whether the computing device is configured to transmit information compliant with the second set of quality of service parameters; and
    upon determining that the computing device is configured to transmit information compliant with the second set of quality of service parameters:
      adjusting a quality of service mechanism for controlling a quality of service parameter; and
      sending information compliant with the second set of quality of service parameters;
  determining whether the keep alive interval has expired;
  upon determining that the keep alive interval has expired, receiving a new offer message and determining whether the computing device is configured to transmit information compliant with a set of quality of service parameters included in the new offer message;
  upon determining that the keep alive interval has not expired, determining whether it is time to send a keep alive message; and
  upon determining that it is time to send a keep alive message, generating and sending the keep alive message.

9. The method of claim 8, wherein the rejection message includes a cause code indicating which specific quality of service parameters of the first set of quality of service parameters are unacceptable.

10. The method of claim 8, further comprising determining whether the computing device is configured to transmit information compliant with a maximum transmit unit size.

11. The method of claim 8, further comprising determining whether the computing device is configured to transmit information compliant with a minimum transmission rate.

12. The method of claim 8, further comprising adjusting more than one quality of service mechanism.

13. The method of claim 8, further comprising, upon determining that the computing device is not configured to transmit information compliant with the second set of quality of service parameters, iteratively repeating sending a rejection message, receiving a new set of quality of service parameters in response to the rejection message, and determining whether the computing device is configured to transmit information compliant with the new set of quality of service parameters until a determination is made that the computing device is configured to transmit information compliant with the new set of quality of service parameters.

14. The method of claim 8, further comprising sending an offer confirmation message upon determining that the computing device is configured to transmit information compliant with the quality of service parameters included in an offer message.

15. A device, comprising:
  a computing device; and
  a memory storing computer-readable instructions, which, when executed by the computing device, cause the computing device to perform operations comprising:
    sending a first offer message including a first set of quality of service parameters and a keep alive interval;
    receiving an offer rejection message responsive to the first set of quality of service parameters being unacceptable;
    sending a second offer message, wherein the second offer message includes a second set of quality of service parameters and the keep alive interval; and
    receiving information compliant with the second set of quality of service parameters responsive to the second set of quality of service parameters being acceptable;
    determining whether the keep alive interval has expired;
    upon determining that the keep alive interval has expired, receiving a new offer message and determining whether the computing device is configured to transmit information compliant with a set of quality of service parameters included in the new offer message;
    upon determining that the keep alive interval has not expired, determining whether it is time to send a keep alive message; and
    upon determining that it is time to send a keep alive message, generating and sending the keep alive message.

16. The device of claim 15, wherein the instructions, when executed by the computing device, further cause the computing device to receive an offer confirmation message responsive to the second set of quality of service parameters being acceptable.

17. The device of claim 15, wherein the instructions, when executed by the computing device, further cause the computing device to iteratively repeat receiving an offer rejection message and sending a new offer message including a new set of quality of service parameters responsive to the new set of quality of service parameters being unacceptable until the new set of quality of service parameters is acceptable.

18. The device of claim 15, wherein receiving the offer rejection message includes receiving a cause code indicating which quality of service parameters are unacceptable.

* * * * *